March 12, 1963  E. E. DISON  3,081,119
AUTOMOBILE FENDER ASSEMBLY
Filed Nov. 2, 1959
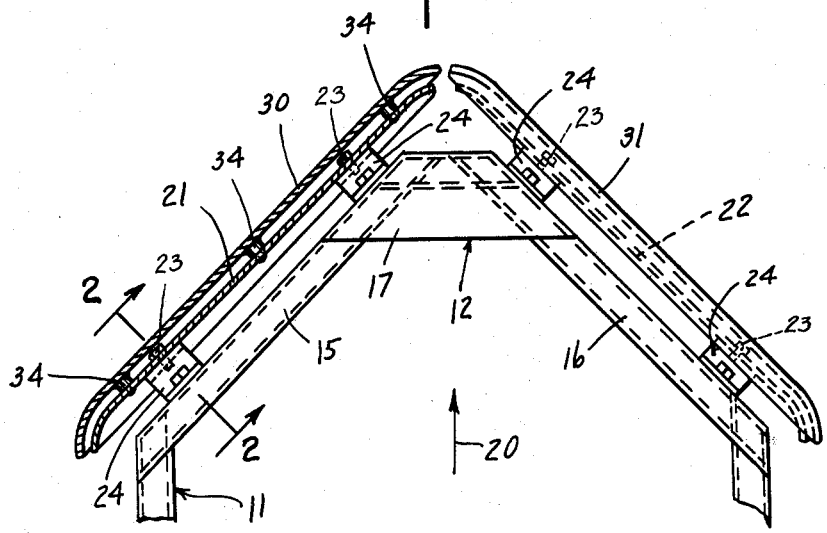
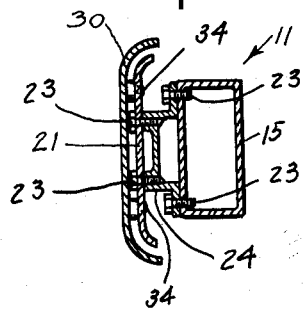
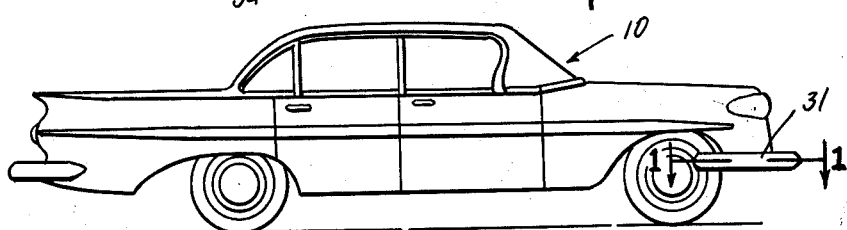
INVENTOR.
ERNEST E. DISON.
BY
Lockwood, Woodard, Smith + Weikart.
ATTORNEYS.

United States Patent Office 3,081,119
Patented Mar. 12, 1963

3,081,119
AUTOMOBILE FENDER ASSEMBLY
Ernest E. Dison, R.R. 18, Box 536A,
Indianapolis, Ind.
Filed Nov. 2, 1959, Ser. No. 850,219
9 Claims. (Cl. 293—48)

The present invention relates to automobiles and to an automobile fender or bumper assembly.

As is well known, one of the major everyday problems is the tremendous property damage and death toll resulting from highway accidents. Present day automobiles have a rectangular shape and have four wheels located at or near the corners of the rectangle and arranged in such a manner that, as the automobile moves, one flat surface of the rectangular shape leads the automobile. When an accident occurs on the highway and two such rectangular shapes strike one another head on, death and tragedy can occur.

It is therefore a primary object of the present invention to provide an automobile with a pointed or angled type front. Accordingly, if two such automobiles are traveling on a highway toward one another and meet in a head-on collision, the automobiles will slide off one another and the probability of injury to the occupants will be lessened unless, of course, the unlikely situation occurs of the points of the automobiles hitting dead center. In like manner, if the pointed automobile strikes a tree, telephone pole, bridge abutment or other obstruction, the automobile will, in almost all cases, slide off the obstruction and the probability of injury to the occupants will be less likely to occur.

Another object of the present invention is to provide an automobile and bumper assembly which does not show damage resulting from a minor accident and which, therefore, does not need to be in the repair shop as often as the conventional automobile.

A further object of the present invention is to provide an improved automobile and bumper assembly.

Another object of the present invention is to provide an automobile and bumper assembly incorporating a plurality of bumpers, one or more of which are shed as a result of each accident in which the car is involved, leaving the car unharmed and its appearance unmarred.

Still a further object of the present invention is to provide an automobile and bumper assembly incorporating bumpers which are arranged to be sheared off each time an accident occurs but which bumpers may be reattached to the car after the accident if the damage to the bumpers has not been unduly great.

Still further objects and advantages of the present invention will become apparent as the description proceeds.

In accordance with the present invention, there is provided an automobile having a generally tapered front end. A pair of bumpers are fixed to the tapering portions of said front end and a further pair of bumpers are nested over respective ones of the first mentioned pair of bumpers. The further pair of bumpers are fixed to the first mentioned pair of bumpers less securely than the first mentioned pair of bumpers are fixed to the automobile, whereby the further pair of bumpers will shear off upon the striking of obstructions by said automobile.

The full nature of the invention will be understood from the accompanying drawings and the following description and claims:

FIG. 1 is a top plan view partially in section of an automobile and bumper assembly as embodied in the present invention, the section being taken along the line 1—1 of FIG. 3 in the direction of the arrows.

FIG. 2 is a vertical section taken along the line 2—2 of FIG. 1 in the direction of the arrows.

FIG. 3 is a side elevation of an automobile incorporating the present invention.

Referring now to the drawings, this invention comprises an automobile or vehicle 10 having a frame 11, the front end 12 of which is tapered or pointed. The front end of the frame is made up of two box members 15 and 16 and a connecting member 17 which fixes the box members together. When the automobile is moving forwardly as indicated by the arrow 20 in FIG. 1, the frame members 15 and 16 define straight surfaces which are at an angle of approximately 45° with the direction of movement of the automobile.

Firmly and securely fixed to the respective frame members 15 and 16 are a pair of bumpers 21 and 22. A plurality of screws 23—23 cooperate with connecting members 24—24 to insure that the bumpers 21 and 22 are most securely attached to the automobile. It should be noted that the bumpers 21 and 22 are each arranged in generally parallel relation to the frame members 15 and 16 and therefore, are also at an angle of 45° to the direction of movement of the automobile.

A second pair of bumpers 30 and 31 are disposed in parallel relation to the bumpers 21 and 22 and in such a manner as to nest with and shield or cover the respective bumpers 21 and 22. The bumpers 30 and 31 are fixed to the bumpers 21 and 22 by means of a plurality of shear bolts 34—34. The shear bolts are constructed in such a manner that they are much weaker in shear than are the connecting members 24 and the bolts 23. Thus, assuming that the automobile is moving forwardly in the direction of the arrow 20 and strikes an obstruction in such a manner that the bumper 30 or the bumper 31 engages the obstruction, the respective bumper will be sheared off from the bumper 21 or 22 upon which it is mounted leaving the automobile and remaining bumpers unharmed and unmarred in appearance.

If desired, the driver of the automobile may continue to use the automobile with the bumper removed therefrom. Alternatively, he may reattach the bumper to the automobile by a further plurality of shear bolts such as the bolts 34.

It should be understood, however, that the primary object of the invention is the protection of the occupants of the automobile. Thus, when the automobile strikes an obstruction one of the bumpers 30 or 31 will shear off because it will frictionally engage the obstruction. The particular bumper 21 or 22 associated with the bumper 30 or 31 will move within the outward bumper which will act as a sliding track for the inner bumper whereby the automobile will be deflected from the obstruction. It can be seen that, instead of the automobile coming to an abrupt stop, the automobile will continue on and the probability of injury to the occupants is lessened.

From the above description, it will also be evident that the present invention provides an automobile and bumper assembly which does not show damage resulting from a minor accident and which, therefore, does not need to be in the repair shop as often as a conventional automobile. It will also be obvious that various modifications of the invention can be conceived, for example, instead of a pair of nested bumpers, three or more such nested bumpers might be used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:
1. A bumper assembly for attachment to a vehicle comprising a bumper, means for securing said bumper to the vehicle, a further bumper nested over said first bumper with said first bumper forming a trackway for said further bumper, shearable means fixing said further bumper to said first bumper less securely than said first mentioned means secures said first bumper to said vehicle whereby said further bumper can shear off and ride along said first bumper upon the striking of an obstruction by said further bumper.

2. A bumper assembly for attachment to a vehicle comprising a first elongated bumper, means for fixing said first bumper to the vehicle, a further elongated bumper nested over said first bumper, said further bumper having an elongated recess therein into which said first bumper projects whereby said first bumper forms a trackway for said further bumper, shearable means fixing said further bumper to said first bumper less securely than said first mentioned means fixes said first bumper to said vehicle whereby said further bumper can shear off and ride along said first bumper upon the striking of an obstruction by said further bumper.

3. In combination, a vehicle, an elongated bumper fixed to the vehicle, a further bumper nested over said first bumper, said further bumper having an elongated concave recess therein into which said first bumper projects whereby said first bumper forms a trackway for said further bumper, shearable means fixing said further bumper with relation to said vehicle but less securely than said first bumper is fixed to said vehicle whereby said further bumper will shear off and ride along said first bumper upon the striking of an obstruction by said vehicle.

4. In combination, a vehicle, a first pair of elongated horizontal bumpers arranged at an agle to one another and fixed to the vehicle, a further pair of bumpers nested over respective ones of said first pair of bumpers, each of said further bumpers having an elongated concave recess therein into which a respective one of said first pair of bumpers projects whereby said first pair of bumpers form trackways for said further pair of bumpers, shearable means fixing said further pair of bumpers to said first pair of bumpers less securely than said first pair of bumpers are fixed to said vehicle whereby said further pair of bumpers will shear off and ride along said first bumpers upon the striking of obstructions by said vehicle.

5. In combination, a vehicle including a pair of tapering surfaces, a first pair of elongated horizontal bumpers fixed to the vehicle, each of said bumpers being parallel to and shielding a respective one of said surfaces, a further pair of bumpers, said first pair of bumpers forming trackways for said further pair of bumpers, shearable means fixing said further pair of bumpers to said first pair of bumpers less securely than said first pair of bumpers are fixed to said vehicle whereby said further pair of bumpers will shear off and ride along said first bumpers upon the striking of obstructions by said vehicle.

6. In combination, an automobile including a pair of tapering surfaces defining a generally pointed front end, a first pair of elongated horizontal bumpers fixed to the automobile, each of said bumpers being parallel to and shielding a respective one of said surfaces, a further pair of bumpers nested over respective ones of said first pair of bumpers, each of said further bumpers having an elongated concave recess therein into which a respective one of said first pair of bumpers projects whereby said first pair of bumpers form trackways for said further pair of bumpers, shearable means fixing said further pair of bumpers to said first pair of bumpers less securely than said pair of bumpers are fixed to said automobile whereby said further pair of bumpers will shear off and ride along said first bumpers upon the striking of obstructions by said automobile.

7. In combination, an automobile having a front end formed with a pair of tapering surfaces, a first pair of elongated bumpers, one of said pair of bumpers fixed to and shielding one of said pair of tapering surfaces and the other of said pair of bumpers fixed to and shielding the other of said pair of surfaces, said bumpers each being parallel to and spaced from the surface to which it is fixed, said bumpers each extending horizontally, a second pair of elongated bumpers, a group of bolts fixing one of said second pair of bumpers in shielding relation to one of said first pair of bumpers, a group of bolts fixing the other of said second pair of bumpers in shielding relation to the other of said first pair of bumpers, each of said second pair of bumpers having a concave shape and being spaced from and parallel to the bumper to which it is fixed, each of said second pair of bumpers being nested over and partially receiving one of said first pair of bumpers in the second bumper's concave shape, each group of bolts being weaker in shear than the connection of said first pair of bumpers to said automobile whereby said second pair of bumpers will be sheared off from said first pair of bumpers when said automobile strikes obstructions leaving said automobile and first pair of bumpers unharmed.

8. In combination, an automobile having a pair of generally straight surfaces at the front end thereof, said automobile arranged to move in a path with the straight surfaces leading and defining a generally pointed front end, a plurality of bumpers secured to said automobile and shielding said surfaces, some of said plurality of bumpers shielding others of said plurality of bumpers, said some bumpers secured to said automobile less securely than the others of said bumpers, said other bumpers being elongated and defining trackways for said some bumpers and extending at an acute angle to the path of movement of the automobile.

9. An automobile and bumper assembly comprising an automobile having a generally straight surface, said surface being located on the automobile in such a manner that it leads the automobile as the automobile moves and is arranged at an acute angle with the direction of movement, a first elongated horizontal bumper fixed to said automobile and shielding said surface, and arranged in a generally parallel relation thereto, a second bumper nested over said first bumper, and shearable bolts securing said second bumper to said automobile whereby when said second bumper strikes an obstruction, it can shear off and move along said first bumper acting as a trackway leaving said first bumper and automobile relatively unharmed.

References Cited in the file of this patent
UNITED STATES PATENTS

| | | |
|---|---|---|
| 440,729 | Upton | Nov. 18, 1890 |
| 547,321 | Black et al. | Oct. 1, 1895 |
| 2,354,700 | Pezzano | Aug. 1, 1944 |
| 2,519,429 | Brandvold | Aug. 22, 1950 |
| 2,610,881 | Schuettpelz | Sept. 16, 1952 |
| 2,811,385 | Butler | Oct. 29, 1957 |
| 2,873,994 | Omps | Feb. 17, 1959 |
| 2,954,256 | Barenyi | Sept. 27, 1960 |